United States Patent [19]

Myerson et al.

[11] Patent Number: 5,750,975
[45] Date of Patent: May 12, 1998

[54] HAND HELD BAR CODE DATAFORM READER HAVING A ROTATABLE READING ASSEMBLY

[75] Inventors: Robert F. Myerson, Captiva Island, Fla.; Daniel G. Wall, Uniontown, Ohio; Timothy P. O'Hagan, Fort Myers, Fla.

[73] Assignee: Teletransactions, Inc., Akron, Ohio

[21] Appl. No.: 519,849

[22] Filed: Aug. 25, 1995

[51] Int. Cl.⁶ .................................................. G06K 7/10
[52] U.S. Cl. .................................. 235/472; 235/462
[58] Field of Search ............................ 235/462, 472, 235/494, 467, 470, 454

[56] References Cited

U.S. PATENT DOCUMENTS

| | | | |
|---|---|---|---|
| D. 297,939 | 10/1988 | Bradbury et al. | D14/100 |
| D. 303,663 | 9/1989 | Kumar et al. | |
| D. 309,295 | 7/1990 | de la Huerga et al. | D14/100 |
| D. 334,922 | 4/1993 | Meyerson et al. | 114/100 |
| D. 340,034 | 10/1993 | Hofstetter et al. | D14/100 |
| 4,387,297 | 6/1983 | Swartz et al. | 235/472 |
| 4,412,751 | 11/1983 | Jeannet et al. | 368/276 |
| 4,460,120 | 7/1984 | Shepard et al. | 235/472 |
| 4,593,186 | 6/1986 | Swartz et al. | 235/472 |
| 4,621,189 | 11/1986 | Kumar et al. | 235/472 |
| 4,660,221 | 4/1987 | Dlugas | 235/462 |
| 4,758,717 | 7/1988 | Shepard et al. | 235/472 |
| 4,794,239 | 12/1988 | Allias | 235/462 |
| 4,835,713 | 5/1989 | Pastor | 364/519 |
| 4,889,982 | 12/1989 | Young et al. | 235/494 |
| 4,916,441 | 4/1990 | Gombrich | 235/472 |
| 5,015,831 | 5/1991 | Eastman et al. | 235/472 |
| 5,043,854 | 8/1991 | Gammache | 362/197 |
| 5,113,445 | 5/1992 | Wang | 235/462 |
| 5,123,064 | 6/1992 | Hacker et al. | 382/59 |
| 5,130,207 | 7/1992 | Shepard et al. | 235/462 |
| 5,144,120 | 9/1992 | Krichever et al. | 235/462 |
| 5,202,817 | 4/1993 | Koenck et al. | 361/393 |
| 5,216,233 | 6/1993 | Main et al. | 235/472 |
| 5,227,614 | 7/1993 | Danielson et al. | 235/472 |
| 5,227,617 | 7/1993 | Christopher et al. | 235/462 |
| 5,237,161 | 8/1993 | Grodevant | 235/462 |
| 5,243,655 | 9/1993 | Wang | 235/462 |
| 5,304,786 | 4/1994 | Pavlidis et al. | 235/462 |
| 5,324,925 | 6/1994 | Koenck et al. | 235/472 |
| 5,331,136 | 7/1994 | Koenck et al. | 235/472 |
| 5,337,361 | 8/1994 | Wang et al. | 235/472 |
| 5,367,152 | 11/1994 | Krichever et al. | 235/472 |
| 5,406,063 | 4/1995 | Jelen | 235/472 |
| 5,471,042 | 11/1995 | Kirkeby et al. | 235/472 |
| 5,477,044 | 12/1995 | Aragon | 235/472 |
| 5,479,002 | 12/1995 | Heiman et al. | 235/472 |

OTHER PUBLICATIONS

Monicor Electronic Corp. Brochure for Monicor Model IC–100 Radio Modem Entitled "Monicor Snap–On Radio Modem for Mars Electronics MEQ™ Terminals," undated.

Article by Symbol Technologies, Inc. Entitled "A Primer for Two Dimensional Bar Codes, Portable Data Files and PDF417", Bohemia, NY, dated Oct. 1990.

Monicor Electronic Corp. brochure for Monicor Model IC–100 radio modem entitled "Monicor snap–on radio modem for Mars Electronics MEQ™ terminals." To the best of Applicants' knowledge, the Monicor brochure was published more than one year prior to Applicants' filing date of Aug. 25, 1995.

*Primary Examiner*—Donald T. Hajec
*Assistant Examiner*—Thien Minh Le
*Attorney, Agent, or Firm*—Watts, Hoffmann, Fisher & Heinke Co., LPA

[57] ABSTRACT

A bar code dataform reader. The reader includes a housing defining an interior region and supporting an exit window. A bar code dataform reading assembly is mounted on a rotatable support within the housing interior region. The reader further includes support rotating structure coupled to the support to facilitate external rotation of the support to a selected one of a plurality of positions. The reading assembly is selectively actuatable to read a bar code dataform and includes a light source component mounted on the support such that, for each of the plurality of support positions, a light beam emitted by the light source component exits the housing through the exit window in a different direction with respect to the housing.

20 Claims, 7 Drawing Sheets

Fig.11

HAND HELD BAR CODE DATAFORM READER HAVING A ROTATABLE READING ASSEMBLY

FIELD OF THE INVENTION

This invention relates to a hand held bar code dataform reader and, more particularly, to a hand held bar code dataform reader having a bar code reading assembly mounted on a rotatable support permitting a plurality of reading orientations.

BACKGROUND OF THE INVENTION

Hand held bar code dataform readers have achieved widespread use in a variety of industrial and commercial applications. Hand held readers are advantageously utilized by manufacturers, merchandisers, and service firms for production and inventory control purposes and product and package routing control.

Hand held bar code dataform readers generally comprise a housing which supports a bar code dataform reading assembly. The reading assembly includes a light source component such as a laser or a plurality of light emitting diodes which, upon actuation of the assembly emits a light beam. The assembly also includes an optical component such as a focusing lens and a mirror for focusing and directing the light beam along an optical path toward the bar code dataform to be read. Finally, a photodetector component such as a photodiode is provided to receive reflected light from the bar code dataform being read and to generate an electrical signal representative of an intensity of the reflected light.

At least one of the mirror, the focusing lens and the light source reciprocates to oscillate or "play" the emitted light beam back and forth across the bar code dataform to be read. The oscillating optical path of the light beam defines a bar code dataform reading plane. The light beam emitted by the light source exits the housing through an exit window which is transparent or semi-transparent. The light reflected from the bar code dataform enters the housing and strikes the photodetector. Depending on the design of the reader, the photodetector may be positioned adjacent the exit window or a separate light return window.

A typical one dimensional (1D) bar code dataform contains coded data or information in a single row of varying width adjacent bars and spaces. The coded information is encompassed in a particular pattern bars and spaces. Start and stop patterns are provided at the beginning and end of the bar code dataform to indicate the boundaries of the actual coding area. The bars and the spaces of a bar code dataform have differing coefficients of light reflectivity. The magnitude of the electrical signal generated by the photodetector varies with the intensity of the light received by the photodetector. The intensity of the reflected light changes over time as the light beam oscillates across and is reflected by the sequence of bars and spaces comprising the bar code dataform.

A decoder electrically coupled to the photodetector is also disposed within the housing. The time varying electric signal generated by the photodetector is processed and converted by the decoder to generate machine-readable data corresponding to the data or information encoded in the read bar code dataform.

Previously proposed bar code dataform readers have included a bar code reading assembly and an exit window in a fixed orientation with respect to the housing. That is, the optical path of the oscillating light beam which defines the reading plane is fixed with respect to the housing and the exit window. To use such a bar code reader, the exit window was pointed toward or "aimed" at the bar code dataform to be read and a reading actuation mechanism was actuated to energized the bar code reading assembly and read the bar code. Such bar code readers were often configured in the shape of a "gun." U.S. Pat. No. 5,130,520 to Shepard et al. is a typical example of a proposed "gun"-type bar code dataform reader.

A "gun"-type bar code dataform reader has limited flexibility due to the fixed orientation of the bar code dataform reading assembly with respect to the housing and exit window. The reading assembly cannot be reoriented to provide a different bar code reading orientation. That is, to change the reading plane the reader housing would have to be repositioned to aim at a target of interest. This has proven to be a significant disadvantage in situations where bar code dataforms to be read are affixed to items that are in close proximity. Closely spaced items often will prevent the "gun"-type bar code dataform reader from being positioned to "aim" at and read the target item bar code dataforms.

Additionally, even if a "gun"-type dataform reader can be oriented to "aim" at the dataforms desired to be read, the fixed orientation of the reading assembly with respect to the housing may result in ergonomic problems. For example, if the bar code dataforms to be read are positioned such that the operator of the "gun"-type dataform reader must bend or his or her hand, wrist and/or arm into an awkward and uncomfortable position to "aim" and actuate the reader to read a bar code dataform, fatigue will result if a large number of bar codes are to be read. Repetitive motion injuries resulting from continual straining of the hand, wrist and arm have been is well recognized in the medical field.

The proposed hand held bar code dataform reader disclosed in U.S. Pat. No. 5,367,152 to Krichever et al. provides for repositioning a structure supporting an exit window. The support structure is removably attachable to a housing in a selected one of two possible positions. This proposed reader thereby provides for bar code reading in two directions or reading planes. While providing greater flexibility in reading orientation with respect to the housing than a "gun"-type reader, this proposal has significant disadvantages. Repositioning the exit window requires removing the exit window support structure from its attached position on the top of the housing. Removal of the support structure is both time consuming and additionally exposes the reading assembly and other electronic components disposed in the housing to environmental contaminants. Yet another disadvantage of the aforementioned dataform reader is that only two reading orientations are possible, the positions being angularly displaced by 180°.

DISCLOSURE OF THE INVENTION

A bar code dataform reader for reading a bar code dataform is disclosed. The reader includes a bar code dataform reading assembly mounted on a rotatable support within a housing interior region. The support is rotatable with respect to the housing and can be indexed to a selected one of a plurality of positions. Each indexing position corresponds to a different bar code reading orientation. The housing includes one or more exit windows through which a beam of light generated by the bar code reading assembly exits the housing and through which reflected light returns.

The bar code dataform reader further includes structure coupled to the support and accessible from an exterior of the housing to permit an operator to rotate the support between the plurality of indexed positions. One or more actuation switches are provided for actuating the bar code reading assembly to commence a bar code reading session.

The bar code dataform reading assembly includes a light source component, a optical component such as a lens or mirror and a photodetector for sensing light reflected from a bar code being read. The reading assembly is configured such that the light beam emitted by the light source component exits through one of the exit windows. At each of the support indexed positions, the light beam exits an exit window at a difference orientation with respect to the housing.

A mirror may advantageously be coupled to an interior wall of the housing to deflect or fold the emitted light beam through the exit window at a desired orientation, including orientations which are not perpendicular to a plane defined by the exit window through which the light beam exits. Furthermore, cover plates rotatably supported on the support and positioned with respect to the reading assembly such that exit windows other than the one that the light beam will exit through will be overlied by the cover plates to provide a visual indication to the operator which exit window the light beam will be emitted through.

In one embodiment a turret is attached to the support. The turret extends through an aperture in the housing and includes a knob at an end of the turret exterior of the housing. Rotation of the turret knob correspondingly rotates the support and the reading assembly. The bar code dataform reader further includes a plurality of actuation switches extending through openings in the housing for actuation of the reading assembly.

In another embodiment of the bar code dataform reader of the present invention, a stepper motor is provided to rotate the support. A plurality of position switches are provided extending through openings in the housing. Each switch is associated with a different reading orientation. The stepper motor is coupled through gears to the support. Actuating a switch causes the stepper motor to drive the support to the reading orientation associated with that switch.

The bar code dataform reader of the present invention is durable, rugged and provides a plurality of bar code dataform reading orientation. Moving between reading orientations is simple and speedy. The bar code dataform reader of the present invention also provides a housing defining an interior region which is effectively sealed from outside environmental contaminants. The multiple reading orientations of the scanning mechanism of the present invention make the reader adaptable for use by both left and right handed users. By appropriately changing the bar code reading orientation, user hand, wrist and arm strain can be mitigated when reading bar code dataforms that are not accessible for "straight ahead" reading with a conventional bar code reader.

An object of the present invention is to provide a novel and unique bar code dataform reader which facilitates reading bar code dataform in a variety of orientations. Another object of this invention is to provide a durable and rugged bar code reader design which includes a sealed housing to provide protection from environmental contaminants. Yet another object of this invention is to provide a bar code dataform reader which includes a bar code dataform reading assembly which can be simply and quickly moved to change the reading orientation of the reader to read in a desired direction.

These and other objects, advantages and features of the invention will become better understood from the detailed description of the preferred embodiment which is described in conjunction with the accompanying drawings.

DETAIL DESCRIPTION

FIG. 1–5 illustrate a portable, hand held bar code dataform reader of the present invention. The reader, shown generally at 10, includes a housing 12 comprised of a durable, light-weight high impact polymer material. The housing 12 defines an interior region 13 (FIG. 5) in which electrical circuitry of the reader (not shown), including a microprocessor mounted on one or more printed circuit boards, (not shown) is supported.

The housing 12 includes a front face 14 (best seen in FIG. 4) and an arcuate back face 16 (best seen in FIG. 1) separated by a side wall. The side wall includes two vertical portions 18, 20, a top portion 20 and a bottom portion 21. The front face 14 comprises an upper surface 22 and a lower surface 24. The upper surface 22 is generally planar and is connected to the lower surface 24, which is also generally planar, by a slanted portion 25 of the front face.

Figure 4:
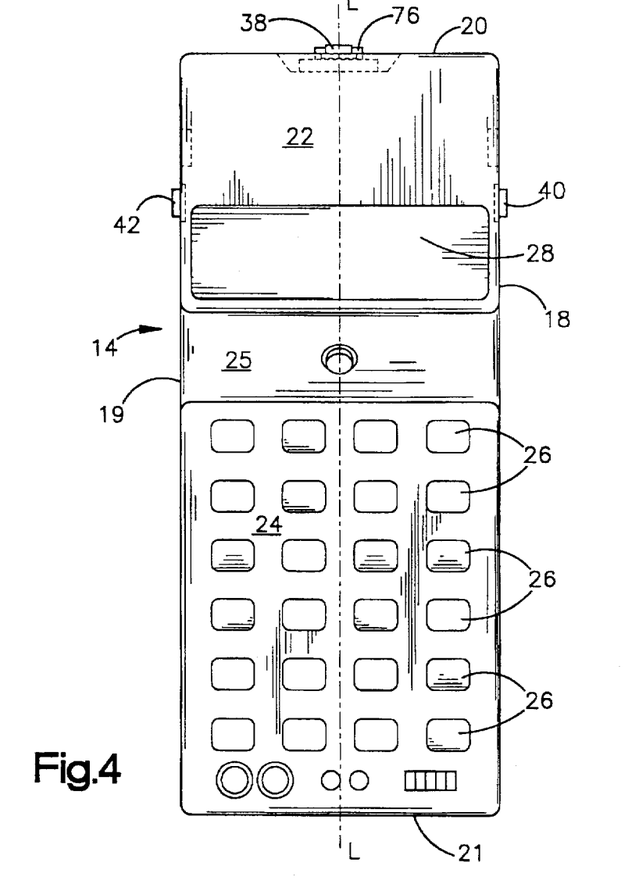
FIG. 4 is a front elevation view of the bar code dataform reader of FIG. 1 is seen from a plane indicated by the line 4—4 in FIG. 3.

As can best be seen in FIG. 4, the front face lower surface 24 supports a keypad including a plurality of key switches 26. The upper surface 22 supports a display panel 28. The key switches 26 and the display panel 28 are appropriately coupled to the electrical circuitry of the reader 10. The housing 12 is adapted to be grasped in one hand of an operator (not shown) with the operator's thumb, palm and fingers cradling the back face 16 and vertical side walls 22, 24. The operator's free hand is used to actuate the keypad key switches 26. The display panel 28 and the keypad key switches 26 face the operator. The display panel 28 may be a liquid crystal display or any other suitable visual display panel.

The housing 12 additionally includes three rectangular openings which support three exit windows 30, 32, 34. One exit window 30 is arcuate and is disposed in an opening in the housing back face 16, while the exit windows 32, 34 are disposed in the openings in the vertical side walls 18, 20 respectively. The exit windows 30, 32, 34 are comprised of transparent plastic or glass.

The housing 12 also includes apertures through which button portions of momentary actuation switches 36, 38, 40, 42 extend. The actuation switches 36, 38, 40, 42 are coupled between power supply circuitry (not shown) and a bar code dataform reading assembly 50 (FIG. 5) disposed in the housing interior region 13. Depressing any of the actuation switches 36, 38, 40, 42 energizes the reading assembly 50 and commences a bar code dataform reading session to read a bar code dataform 52 (shown in profile in FIG. 5) affixed to an item 54. The button portions of the actuation switches 36, 38, 40, 42 are overlied by a durable, flexible material (not shown) which adheres to the housing to seal the apertures and prevent environmental contaminants from entering the housing interior region 13.

The actuation switch 36 extends through the housing front face 14 and is positioned to be depressed by a thumb of the operator's hand cradling the reader 10. The actuation switches 38, 40, 42 are mounted in the top side wall 20 and the vertical side walls 18, 20 respectively. These actuation switches 38, 40, 42 are provided to allow the operator to easily institute a bar code dataform reading session with his or her free hand regardless of the position of reader 10.

Figure 5:
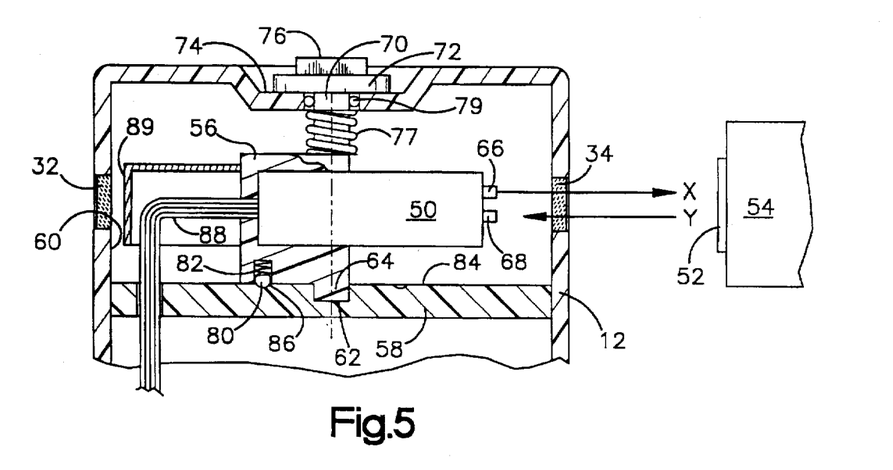
FIG. 5 is an enlarged fragmentary sectional view of a reading assembly of the bar code dataform reader of FIG. 1 showing the reading assembly mounted on rotatable support.

The bar code dataform reader 10 includes the bar code dataform reading assembly 50 (shown schematically in FIG. 5). The reading assembly 50 is mounted on a rotatable support 56. The rotatable support 56 is, in turn, disposed on a horizontal member 58. The horizontal member 58 is attached to an inner wall 60 of the housing 12 and includes a circular recess 62 into which an extending portion 64 of the rotatable support 56 rotatably interfits. Because the bar code dataform reading assembly 50 is mounted on the support 56, rotating the support also rotates the reading assembly.

The bar code dataform reading assembly 50 is of conventional design and a number of suitable reading assemblies are available from various vendors. One category of suitable reading assemblies includes laser scanning assemblies. Another category of suitable bar code reading assemblies includes image sensing array readers.

Specific details of the structure of an image sensing array reader may be found in U.S. patent application Ser. No. 08/507,607, filed Jul.25, 1995 and 08/494,435, filed Jun. 26, 1995, both assigned to Metanetics Corporation of Fort Myers, Florida. Both of these patent applications are incorporated herein in their entireties by reference.

A laser scanning assembly includes a laser and optics, for generating a beam of light. An oscillating mirror directs the light beam toward a bar code to be read and sweeps the beam back and forth across the bar code. The oscillation of the mirror causes the light beam to reciprocate defining a reading plane which is perpendicular to an axis of oscillation of the mirror. The reading plane is triangular in shape and has as its origin the oscillating mirror. Alternatively, the laser may be mounted to an oscillating mechanism to cause the laser itself to oscillate thereby sweeping the emitted light beam back and forth across the bar code to be read. Some of the light striking the bar code is reflected. An intensity of the reflected light varies as a function of composition of the bar code, that is, the individual bars and spaces comprising the bar code. The laser scanning assembly includes a photodiode which is positioned to detect the variable intensity of reflected illumination from the bar code. Signal processing circuitry operates to generate a signal representative of the variable intensity reflected illumination. Appropriate laser scanning assemblies include the Model SE-1000 from Symbol Technologies of Bohemia, New York or the Model 5303 available from PSC Inc. of Webster, N.Y.

Returning to FIG. 4, the reading assembly 50 includes an oscillating light source, schematically represented at 66 (as noted above the "light source" may be, for example, an oscillating mirror in a laser scanning assembly in which the mirror oscillates or the "light source" may be an oscillating laser in a laser scanning assembly in which the laser oscillates). When the reading assembly 50 is actuated, the light source 66 directs an oscillating beam of light through the exit window 32 along an optical path labeled X toward the bar code dataform 52 affixed to the item 54. The light strikes the bar code 52 and is reflected. Some of the light reflected from the bar code dataform 52 follows a path labeled Y which enters the housing 12 through the exit window 32 where the reflected light strikes a light sensitive member such as a photodiode 68. The photodiode 68 generates electrical signals which vary as a function of an intensity of the reflected light striking it. Decoder circuitry (not shown) is electrically coupled to the photodiode 68. The decoder circuitry converts signals generated by the photodiode 68 into machine readable data corresponding to the data encoded in the bar code dataform 52.

Figures 1, 2, 3:
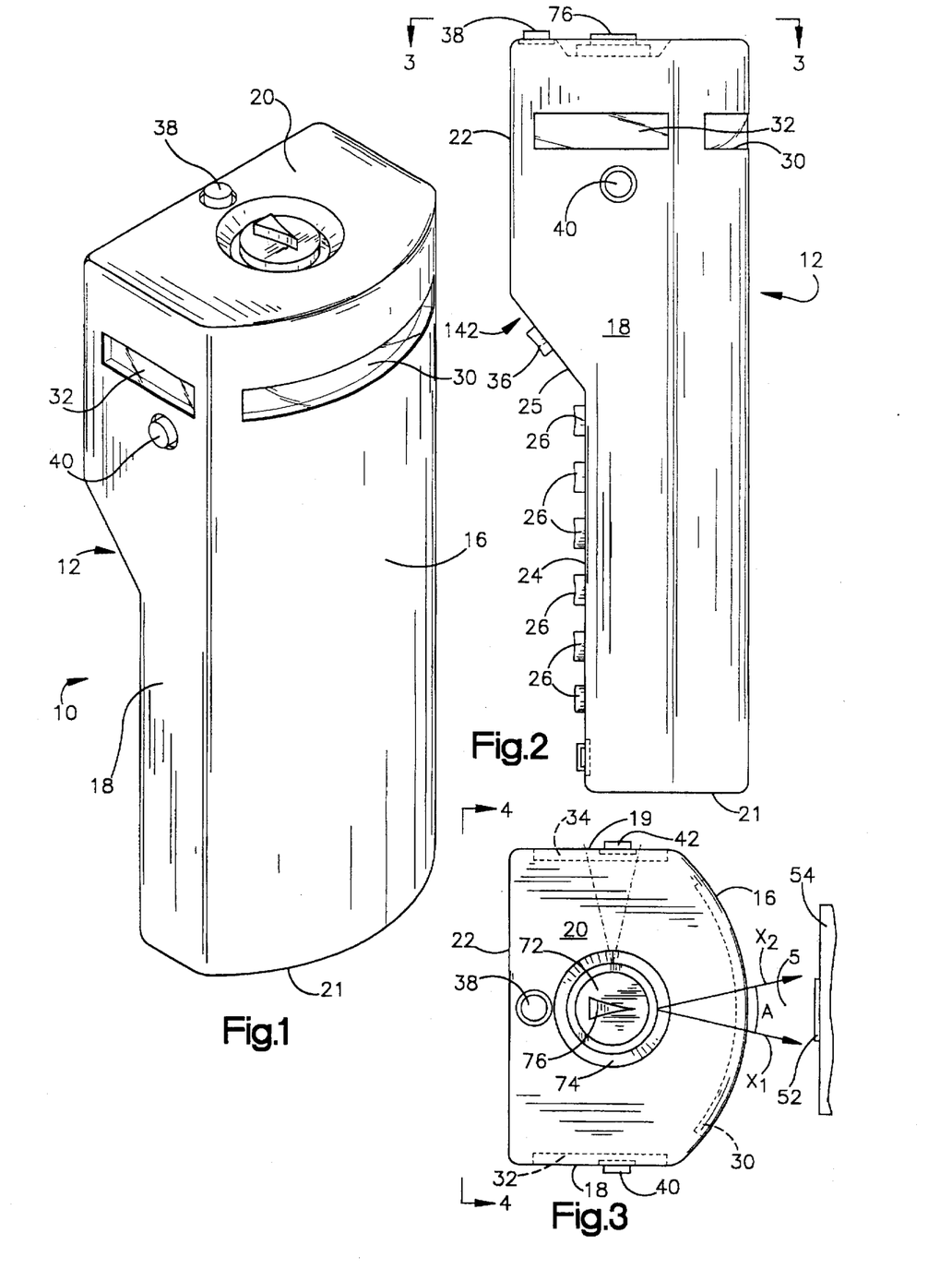
FIG. 1 is a perspective view of a hand held bar code dataform reader of the present invention.
FIG. 2 is a side elevation view of the bar code dataform reader of FIG. 1.
FIG. 3 is a top plan view of the bar code dataform reader of FIG. 1 as seen from a plane indicated by the line 3—3 in FIG. 1.

As noted above, the light source 66 oscillates or reciprocates to repetitively sweep the light beam across the bar code dataform 52. The oscillation of the light source 66 is along an axis of oscillation parallel to a central longitudinal axis L-L of the housing 12 (FIG. 4). In FIG. 3, the rotatable support 58 has been rotated 90 degrees from the position shown in FIG. 5. In FIG. 3, the support 58 is positioned such that the reading assembly 50 reads a bar code through the exit window 30. When viewed from above the reader 10, the optical path defined by the oscillating light beam forms a triangular shaped bar code reading plane represented by S in FIG. 3. The reading plane S is extends outwardly from the light source 66 between boundaries which are represented by rays $X_1$ and $X_2$. The rays $X_1$ $X_2$ define a sweep angle A. The light beam sweeps over the bar code dataform 52.

A turret 70 is attached to the rotatable support 56 and extends through an opening in the housing 12. Attached to the turret 70, exterior of the housing 12, is knurled knob 72. The knob 72 is disposed in a recessed portion 74 of the housing 12. The knob 70 permits an operator to rotate the support 56 and the reading assembly 50 mounted to it. By turning the knob 70 the operator can selectively position the reading assembly 50 to read out of exit window 30 (FIG. 3), exit window 32 (FIG. 5) or exit window 34 (not shown). The knob 72 includes a raised portion 76 (best seen in FIGS. 1 & 3) forming an arrow. As can be seen in FIG. 3, the raised portion 66 is aligned with the reading assembly 50 such that the arrow points in a direction of reading, that is, the arrow generally points along a line which, when viewed from above the reader 10, would approximately bisect the reading plane S (see FIG. 3). A biasing spring 77 is disposed between the support 56 and the housing inner wall 60 to bias the support against the horizontal member 58. A sealing 0-ring 79 is disposed between the turret 70 and the opening of the housing 12 to prevent contaminants from entering the housing interior region 13.

The support 56 is indexed between three positions which are 90 degrees apart. The three indexing positions correspond to the three reading positions of the reading assembly 50. That is, in one index position of the rotatable support 56, the reading assembly 50 reads a bar code through the exit window 30. In a second support index position, the reading assembly 50 reads a bar code through the exit window 32. In the third support index position, the reading assembly 50 reads a bar code through the exit window 34 (also not shown).

The indexing positions of the support 56 are defined by a detent locking mechanism which releasably locks the support in a selected one of the indexing positions. As can be seen in FIG. 5, the rotatable support 56 includes a recess. The detent locking mechanism includes a ball 80 and a spring 82 which are confine between the recess and an upper surface 84 of the horizontal member 58. The horizontal member 58 includes three spaced apart indentations 86 (only one of which can be seen in FIG. 5).

As the support 56 is rotated by turning the knob 72, the ball 80, biased downwardly against the member 58 by the spring 82, rolls across the horizontal member upper surface until it "drops" into one of the indentations 86. The indentation 86 defines one of the support indexing positions. The ball 80 resting in the indentation 86 locks the support 56 in place for a reading session through the exit window 34. As can be seen in FIG. 5, the indentation 86 is relatively shallow so the ball 80 only drops part way into the indentation. The operator, therefore, does not have to exert a large rotational force on the knob 72 to move the support between indexing positions.

The configuration of the indentations 86, the rotatable support 56 and the reading assembly 50 is such that at each of the detent locking positions, the reading assembly 50 is oriented to read (that is, direct the oscillating light beam) out a different one of the exit windows 30, 32, 34. Stops (not shown) are provided to prevent the operator from rotating the knob 72 toward the operator, that is, past the indexing positions associated with exit windows 32, 34. The stops are necessary for two reasons. First, since there are only three support indexing positions, there is no need for the operator to rotate the support 56 to any other position. Second, a ribbon cable 88 connects the reading assembly 50 to other electronic circuitry (not shown) mounted on one or more printed circuit boards in the housing interior region 13. The stops prevent the operator from rotating the support 56 around and around which would causing the ribbon cable 88 disconnect from the circuit board it is connected to or dislocate the circuit board and/or the reading assembly 50. An exit window blocking plate 89 (FIG. 5) extends outwardly from the support 56 opposite a direction of the light source 66. The blocking plate 89 has three plate portions which are at the level of the exit windows 30, 32, 34. Whichever exit window the reading assembly 50 is oriented to read through, two of the plate portions will be adjacent to and overlying the other two exit window. The outwardly facing sides of the plate portions may be advantageously coated with a high luminescence coating so the operator can easily see which exit windows are "covered", that is, which windows the light beam will not be emitted through.

Figure 6:
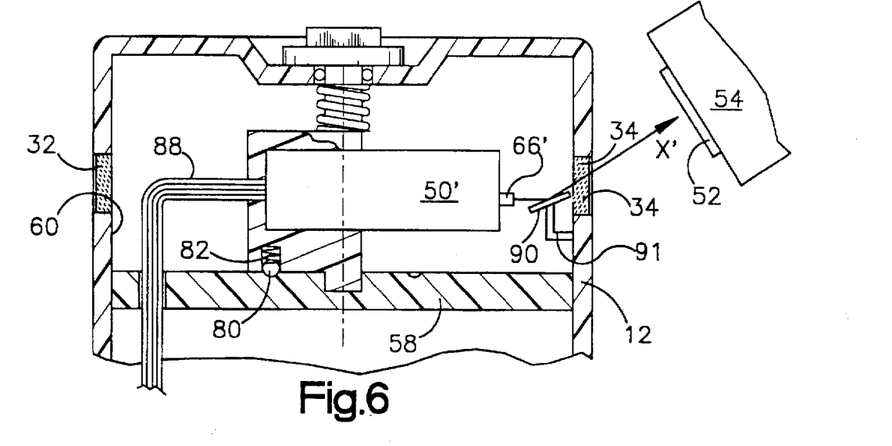
FIG. 6 is an enlarged fragmentary sectional view of the reading assembly of FIG. 4 with a mirror supported by the housing to deflect a direction of a light beam emitted by the reading assembly.

As is clear from FIG. 5, the optical path X is generally perpendicular to the exit windows 30, 32, 34. However, it may be desirable to have the light beam travel along an optical path which is not perpendicular to the exit windows, for example, along a path X' as shown in FIG. 6. Such a deflection or folding of the light beam is easily accomplished in the present invention with minor modification. A light folding mirror 90 affixed to a support 91 is positioned to fold a light beam emitted by a bar code reading assembly 50' along the optical path X'. The support 91 is affixed to the housing inner wall 60 and folds the light beam emitted by the light source 66' along the optical path X'.

As desired, each of the exit windows 30, 32, 34 may or may not be equipped with a beam folding mirror. Additionally, for those exit windows equipped with a light folding mirror, the angle of folding for each exit window may be different, e.g., a mirror adjacent one exit window may be oriented to fold the light beam upwardly through the exit window at a 30 degree angle (as shown in FIG. 6) while another mirror adjacent another exit window may be oriented to fold the light beam at a downward angle of 45 degrees through the exit window.

Figure 8:
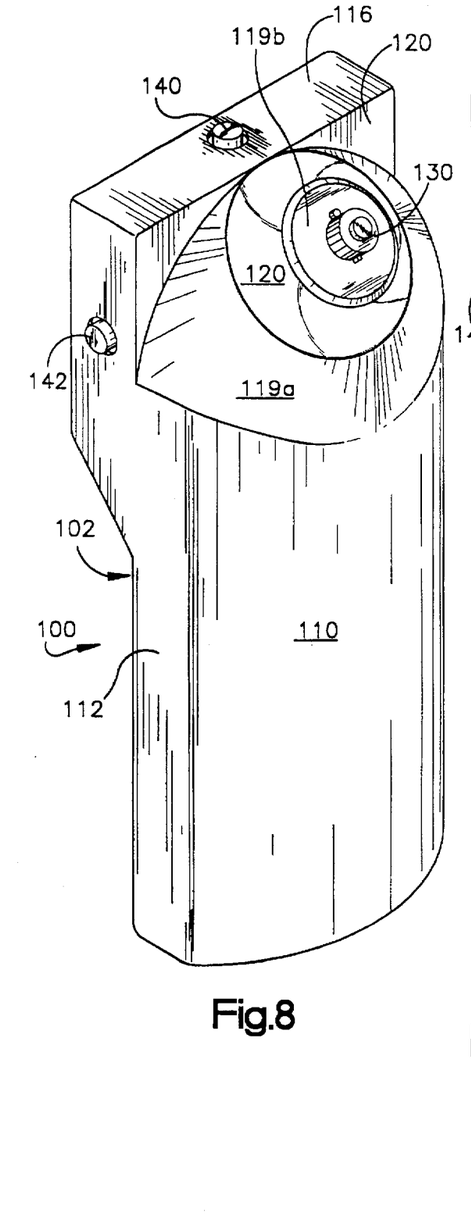
FIG. 8 is a perspective view of an alternate embodiment of the bar code dataform reader of present invention wherein the reading assembly is mounted on a support which rotates nearly 360° to permit reading along a cone shaped reading plane.
Figure 9:
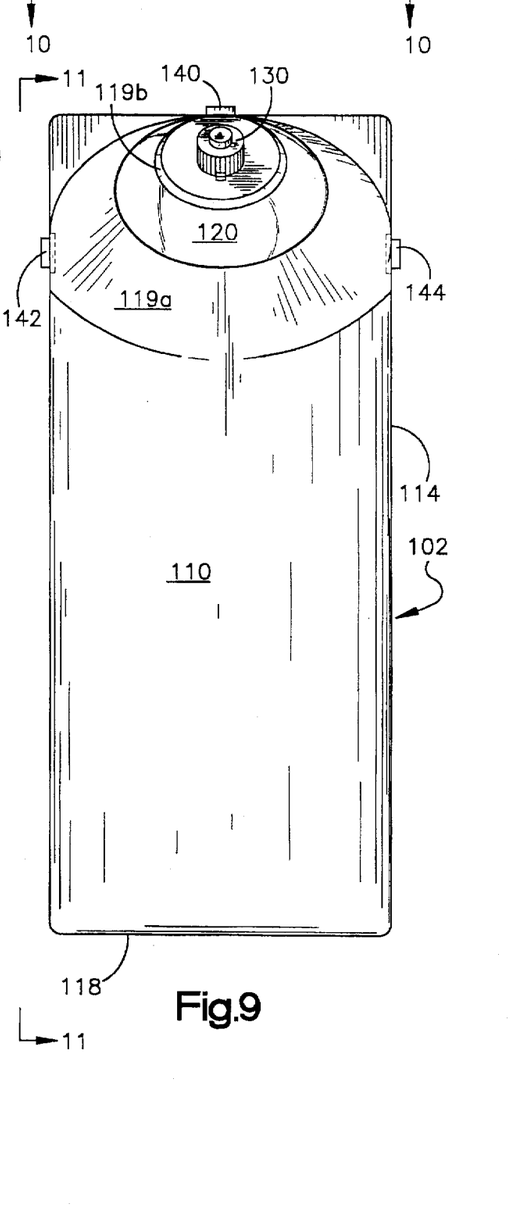
FIG. 9 is a back elevation view of the bar code dataform reader of FIG. 8.
Figure 10:
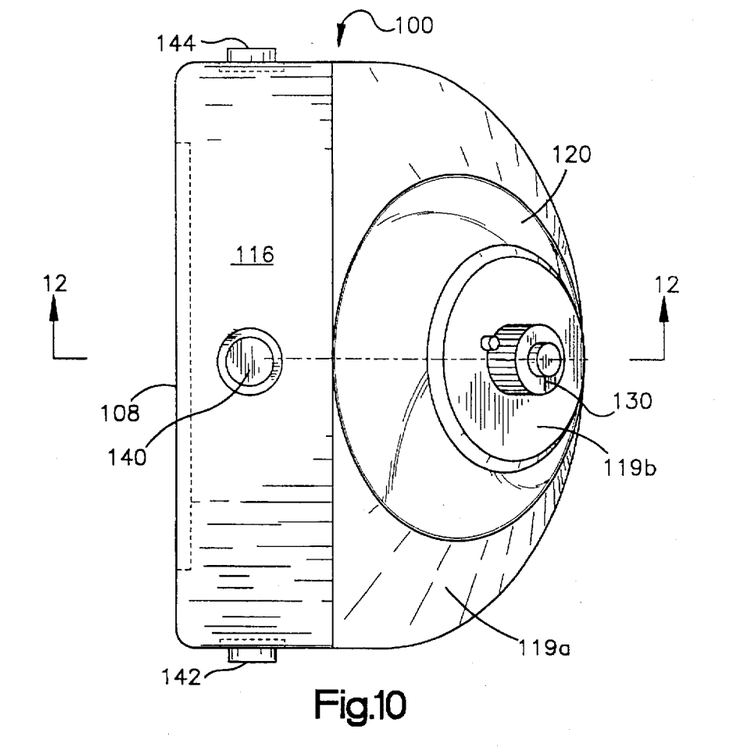
FIG. 10 is top plan view of the bar code dataform reader of FIG. 8 as seen from a plane indicated by the line 10—10 in FIG. 9.
Figure 11:
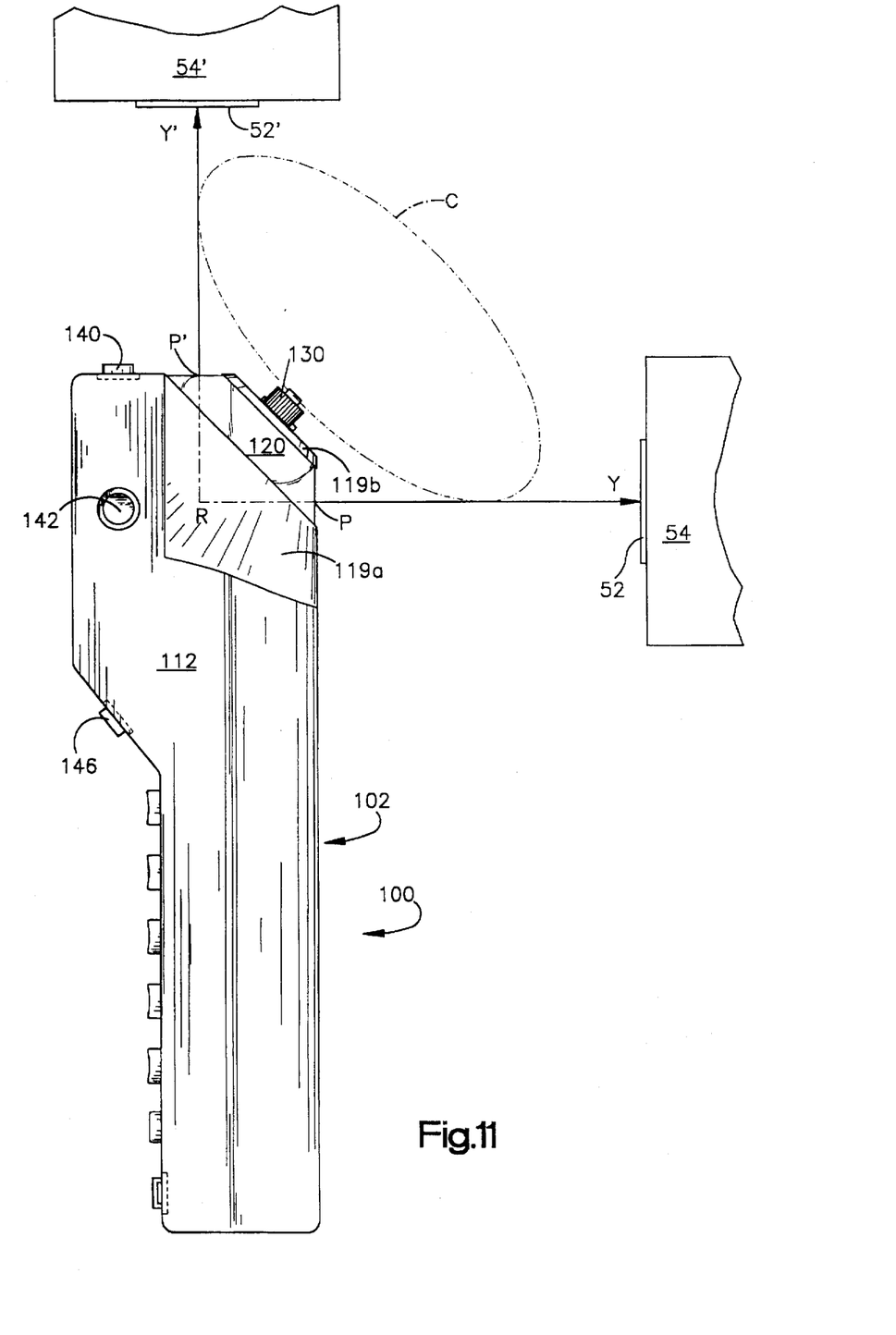
FIG. 11 is a side elevation view of the bar code dataform reader of FIG. 8 as seen from a plane indicated by the line 11—11 in FIG. 8.
Figure 12:
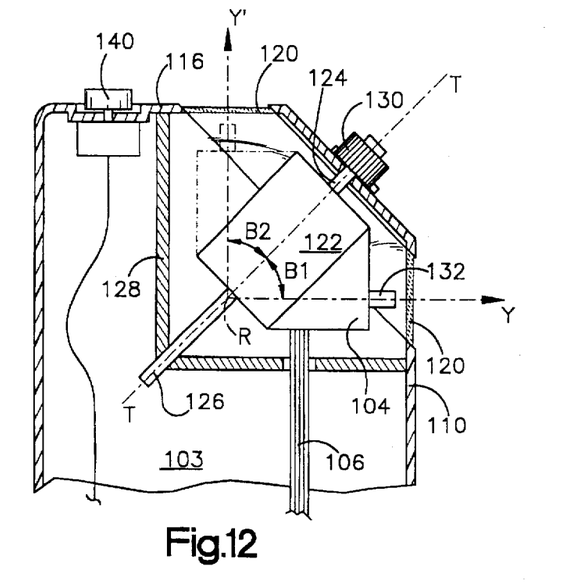
FIG. 12 is an enlarged fragmentary sectional view of a reading assembly of the bar code dataform reader of FIG. 8 showing the reading assembly mounted on rotatable support.
Figure 13:
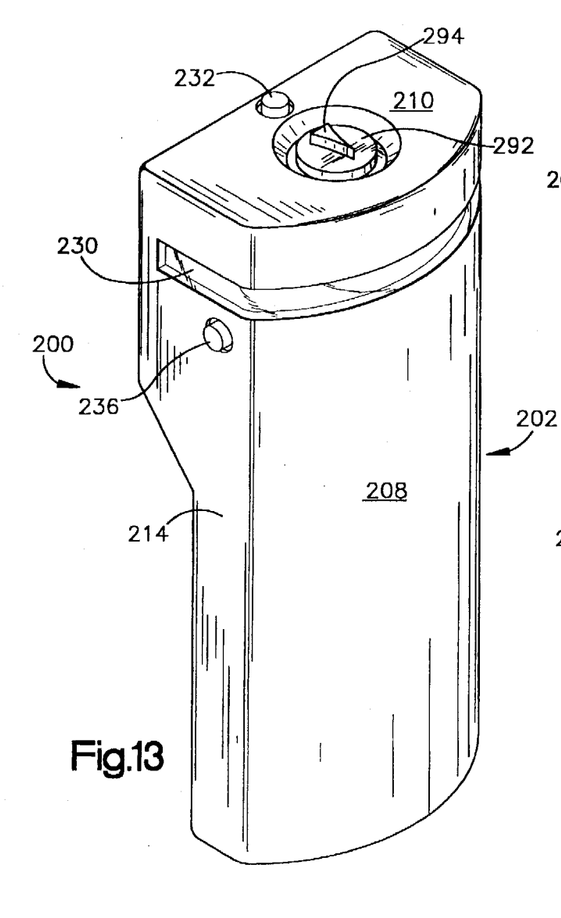
FIG. 13 is another embodiment of the bar code dataform reader of the present invention having a single wraparound exit window.

Another embodiment of the hand held bar code dataform reader of the present invention is shown generally at 100 in FIGS. 8–12. The reader 100 includes a housing 102 defining an interior region 103 (FIG. 12). Disposed in the interior region 103 is a bar code dataform reading assembly 104 coupled by a ribbon cable 106 to electrical circuitry (not shown) of the reader 100. As can be seen in FIGS. 8–10, the housing 102 includes a front face 108 and back face 110 separated by a side wall. The side wall includes two vertical portions 112, 114, a top portion 116 and a bottom portion 118. The back face 110 includes a curved upper region 119. The upper region 119 includes an outer portion 119a and an inner portion 119b which are an aligned series of arcuate openings into which circular shaped exit window 120 is disposed.

Turning to FIG. 12, the reading assembly 104 is mounted on a rotatable support 122. The support 122, in turn, is affixed to a turret 124. One end of the turret 126 is rotatably mounted in an opening in a right angled support member 128 which extends vertically downward from the top side wall 116 and horizontally inward from the front face 110. A knurled knob 130 is affixed to an opposite end the turret 126. The knob 130 seats in a recessed circular portion of the inner portion 119b of the upper region 119. The reading assembly 104 includes a light source 132.

The reading assembly 104 is actuated for a bar code reading session by depressing one of the actuation switches 140, 142, 144, 146. A light beam generated by the light source 132 upon actuation of the reading assembly is directed through the exit window 120 along an optical path Y. As can be seen in dashed line in FIG. 12, turning the knob 130 180 degrees rotates the support 122 and the reading assembly 104 such that, upon actuation, the light beam generated by the light source 132 exits the exit window 120 along an optical path Y'.

It is clear from FIG. 12 that acute angles B1 and B2 are equal. Angle B1 represents the angle between the optical path Y and a central axis T—T through the turret 124 while angle B2 represents the angle between the angle between the optical path Y' and the central axis T—T. Although the angles B1 and B1 are shown as approximately 45 degree angles, it should be understood that by changing the shape of the reading assembly 104 and/or the support 122, the optical path Y and therefore the angles B1 and B2 could easily be changed.

Moreover, the shape of the exit window 120 is configured such that no matter what position the knob 130 is turned to, the optical path of the light beam emitted by the light source 132 passes through the exit window. Conceptually, FIG. 11 shows in dashed line a circle C representing all possible optical paths including Y and Y' as the knob 130 is rotated. The optical paths form a cone having an imaginary vertex represented by R in FIGS. 11 and 12. The vertex R lies along the central axis T—T of the turret 124. The vertex R is imaginary, of course, because the optical paths do not originate at R but rather originate from the light source 122. The light source 122 moves along a circular path of travel having a center point on the central axis T—T. Projecting the optical paths backward through the light source 122 as shown in dashed lines in FIG. 11 and 12 results in the intersection point or vertex R.

The shape of the exit window 120 is easily determined by projecting the cone shaped optical paths onto the housing 102. That is, where the cone represented by circle C and vertex R intersects the housing 102, the exit window 120 must be present to allow the light beam to exit the housing. Points P and P' in FIG. 12 are illustrative of two points of intersection between the cone and the housing. The exit window 120 must be present at P and P' to permit optical paths Y and Y' to be realized. Optical path Y would be utilized to read bar code 52 on item 54, while optical path Y' would be utilized to read bar code 52' on item 54'.

A detent mechanism (not shown) is provided between the turret 124 and the support member 128 to releasably secure the support in a selected one of a plurality of bar code dataform reading positions. Since the exit window 120 is for all intents and purposes continuous and the reading assembly 104 is always oriented to read through the window, the detent mechanism may provide for a large number of support positions in almost a full 360 degree range of support positions. For example, the detent mechanism may provide for locking positions for the support every 20 degrees. That is, at every 20 degree turn of the knob, a ball (not shown) will drop into a corresponding indentation (not shown) to lock the support 122 and the reading mechanism 104 is a stable position so a reading session may be commenced.

A stop is also provided to prevent the knob 130 from being turned more than 360 degrees. The stop is necessary to prevent the ribbon cable 106 from being pulled away from the reader electronic circuitry and/or the reading assembly 104 which would likely result in damage to the cable, the circuitry and/or the reading assembly.

Yet another embodiment of the hand held bar code dataform reader of the present invention, shown generally at 200, is shown in FIGS. 7 and 13-15. The reader 200 includes a housing 202 defining an interior region 204 in which a bar code dataform reading assembly 250 is disposed. The interior region 204 also supports reader electronic circuitry (not shown) mounted on one or more printed circuit boards. The housing 202 includes a front face 206 and a back face 208 separated by a side wall. The side wall includes a top portion 210, a bottom portion 212 and two vertical portions 214, 216. The front face 206 supports a visual display panel 218 and key switches 220 defining a keypad. The housing 202 includes an opening which supports an exit window 230. The exit window 230 extends across the back face 208 and substantially all of the vertical side walls 214, 216, of the housing and portions of vertical side walls 206, 208. Momentary actuation switches 232, 234, 236, 238 extend through apertures in the housing 202. The reading assembly 250 is actuated to commence a bar code reading session by depressing any one of the actuation switches.

Figure 7:
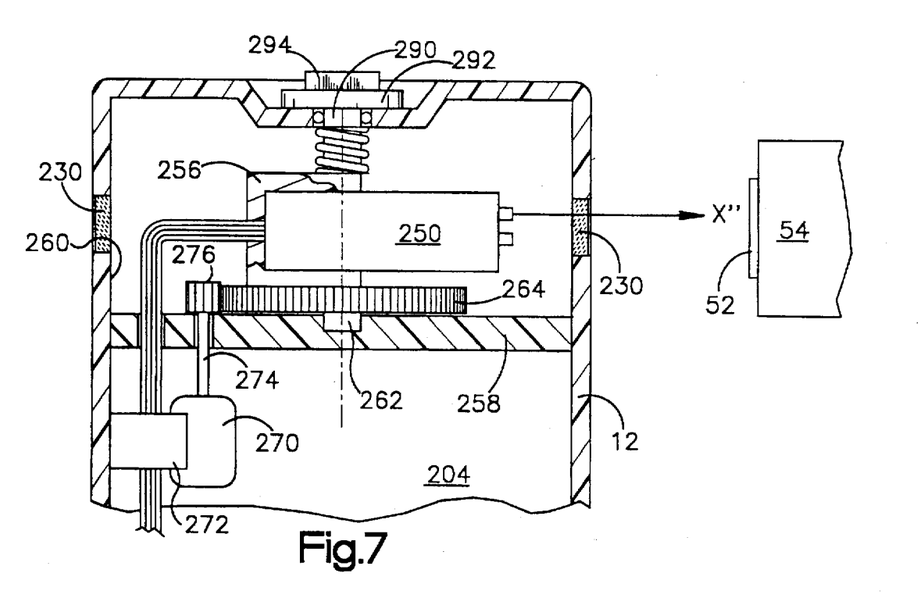
FIG. 7 is an enlarged fragmentary sectional view of a reading assembly mounted on a rotatable support, the support being rotatably driven by a stepper motor.

Turning to FIG. 7, the reading assembly 250 is mounted on a rotatable support 256. The support 256, in turn, is mounted on a horizontal member 258 which extends from an inner wall 260 of the housing 202. A bottom portion of the support 256 includes an extending member 262 which rotatably fits into an opening in the horizontal member 258. The bottom portion of the support 256 also includes an annular portion 264 having gear teeth on its outer periphery.

Figure 14:
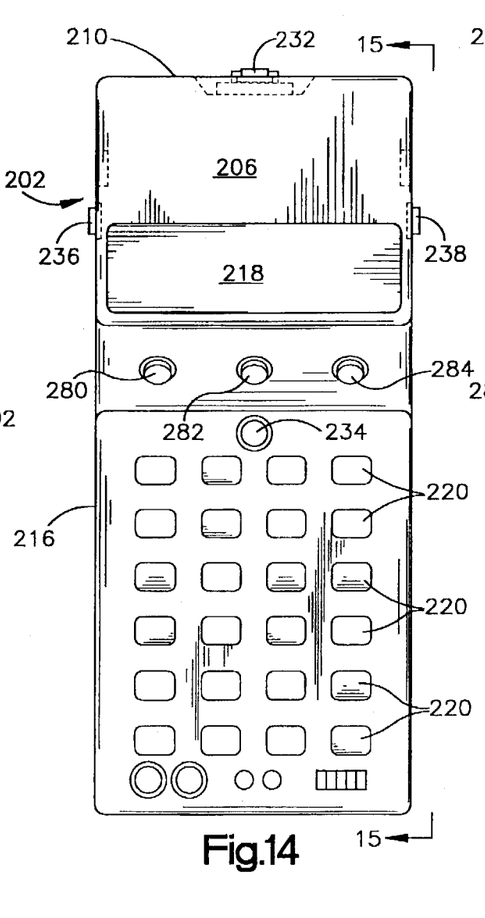
FIG. 14 is a front elevation view of the bar code dataform reader of FIG. 13.
Figure 15:
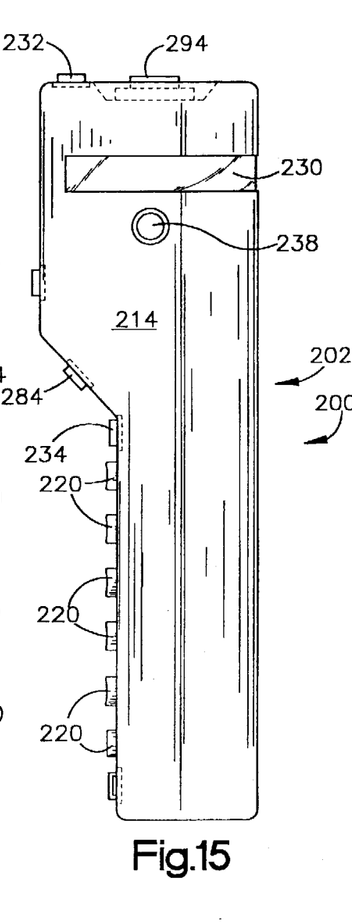
FIG. 15 is a side elevation view of the bar code dataform reader of FIG. 13 as seen from a plane indicated by the line 15—15 in FIG. 14.

A stepper motor 270 is secured to the housing inner wall 260 by a bracket 272. The motor 270 includes a shaft 274 to which is pinned a gear 276. The gear 276 interfits with the geared periphery of the annular portion 264 of the support 256 to rotate the support into a bar code reading position. As can be seen in FIG. 14, three stepper motor actuation key switches 280, 282, 284 extend through apertures in the housing 202. The operator depresses a selected one of three switches to actuate the stepper motor 270. Each switch 280, 282, 284 is associated with a different support position. For example, depressing switch 280 would cause the stepper motor 270 to rotate the support 256 and the reading assembly 250 mounted thereto so that reading a bar code 52 will occur along an optical path X" which exits through a portion of the exit window 230 in the vertical side wall 216. Depressing switch 282 would cause the stepper motor 270 to rotate the support 256 and the reading assembly 250 mounted thereto so that the optical path X" exits through a portion of the exit window 230 in the back face 208. Finally, depressing switch 284 would cause the stepper motor 270 to rotate the support 256 and the reading assembly 250 mounted thereto so that the optical path X" exits through a portion of the exit window 230 in the vertical side wall 216.

The support 256 includes a turret 290 which extends through an opening in the housing 202. An end of the turret 290 which is exterior of the housing 202 includes a knob 292 with a raised arrow 294 (best seen in FIG. 13). The arrow 294 points in the direction of the optical path X" so the operator can visually verify that the reader 200 will be reading in the desired reading direction prior to actuating the reading assembly 250.

Although the invention has been described in its preferred form with a certain degree of particularity, it is understood that the present disclosure of the preferred form has been made only by way of example and that numerous changes in the details of construction, operations, and the combination and arrangements of parts may be resorted to without departing from the spirit and scope of the invention as hereinafter claimed.

We claim:

1. A bar code dataform reader comprising:
   a) a housing defining an interior region and including an exit window;
   b) a rotatable support mounted in the housing interior region, the support being rotatable to a selected one of a plurality of support positions;
   c) a bar code dataform reading assembly mounted on the support, the reading assembly being selectively actuatable to read a bar code dataform by emitting a beam of light; and d) for each of the plurality of support positions, the beam of light emitted by the reading assembly exiting the housing through a different portion of the exit window along a different path of travel with respect to the housing and for at least two positions of the plurality of support positions, the beam of light exits the housing through spaced apart portions of the exit window.

2. A bar code dataform reader comprising:

a) a housing defining an interior region and including a plurality of spaced apart exit windows;

b) a rotatable support mounted in the housing interior region, the support being rotatable to a selected one of a plurality of support positions;

c) a bar code dataform reading assembly mounted on the support, the reading assembly being selectively actuatable to read a bar code dataform by emitting a beam of light;

d) for each of the plurality of support positions, the beam of light emitted by the reading assembly exiting the housing through the exit window along a different path of travel with respect to the housing; and e) wherein the light beam emitted by the reading assembly exits the housing through different exit windows in at least two of the support positions.

3. The bar code dataform reader of claim 2 further including a support rotating structure coupled to the rotatable support for rotating the support between the plurality of support positions.

4. The bar code dataform reader of claim 3 wherein the support rotating structure includes a turret coupled to the support and extending through an aperture in the housing and being rotatable external to the housing, the support being rotatable with the turret.

5. The bar code dataform reader of claim 4 wherein a sealing ring is disposed between the housing aperture and the turret.

6. A bar code dataform reader comprising:

a) a housing defining an interior region and including an exit window;

b) a rotatable support mounted in the housing interior region, the support being rotatable to a selected one of a plurality of support positions;

c) a bar code dataform reading assembly mounted on the support, the reading assembly being selectively actuatable to read a bar code dataform by emitting a beam of light;

d) for each of the plurality of support positions, the beam of light emitted by the reading assembly exiting the housing through the exit window along a different path of travel with respect to the housing;

e) a support rotating structure coupled to the rotatable support for rotating the support between the plurality of support positions and including a turret coupled to the support and extending through an aperture in the housing and being rotatable external to the housing, the support being rotatable with the turret, an end of the turret extending exteriorly of the housing including a knob for rotating the turret, the knob including a raised portion forming an arrow which points generally along a path of travel of the light beam upon exiting the housing; and f) a sealing ring disposed between the housing aperture and the turret.

7. The bar code dataform reader of claim 1 wherein the support includes a detent which engages one of a plurality of spaced apart indentations in a member affixed to the housing to releasably secure the support in the selected one of the plurality of support positions.

8. The bar code dataform reader of claim 1 additionally including a mirror mounted on the housing to fold the light beam in a direction transverse to a non-deflected direction of the beam.

9. The bar code dataform reader of claim 1 wherein the support is disposed at an acute angle with respect to a plane defined by the exit window.

10. The bar code dataform reader of claim 1 further including an actuation mechanism having at least one switch coupled to the reading assembly for selectively actuating the reading assembly.

11. The bar code dataform reader of claim 10 wherein the actuation mechanism includes a plurality of spaced apart momentary switches extending through apertures in the housing and operable from an exterior of the housing.

12. A bar code dataform reader comprising:

a) a housing defining an interior region and including three spaced apart exit windows;

b) a rotatable support mounted in the housing interior region, the support being rotatable to a selected one of a plurality of support positions;

c) a bar code dataform reading assembly mounted on the support, the reading assembly being selectively actuatable to read a bar code dataform by emitting a beam of light;

d) for each of the plurality of support positions, the beam of light emitted by the reading assembly exiting the housing through the exit window along a different path of travel with respect to the housing.

13. The bar code dataform reader of claim 12 wherein adjacent exit windows are angularly displaced one from the other by substantially 90°.

14. A dataform reader comprising:

a) A housing defining an interior region and including an exit window;

b) a rotatable support mounted in the housing interior region, the support being rotatable to a selected one of a plurality of support positions;

c) a dataform reading assembly mounted on the support, the reading assembly being selectively actuatable to read a dataform by emitting a beam of light;

d) for each of the plurality of support positions, the beam of light emitted by the reading assembly exiting the housing through the exit window along a different path of travel with respect to the housing; and e) the support rotating structure including a motor which is coupled to the support and which rotates the support between at least two predetermined support positions of the plurality of support positions.

15. The dataform reader of claim 14 wherein the motor is a stepper motor including an output shaft and gear affixed thereto, the gear engaging and driving a toothed peripheral portion of the support to rotate the support between the plurality of support positions.

16. The dataform reader of claim 15 wherein a plurality of stepper motor actuation switches are provided, each switch when actuated energizing the stepper motor to move the support to a different predetermined one of the plurality of support positions.

17. A hand held dataform reader comprising:

(a) a body portion configured to be held in an operator's hand, the body portion defining an interior region and having an exit window;

(b) a support rotatably mounted in the body portion interior region;

(c) a dataform reading mechanism affixed to the support, the mechanism being selectively actuatable to read a dataform through the exit window; and (d) the support being selectively rotatable about an axis of rotation to a selected one of a plurality of support positions wherein at each position of the plurality of support positions the dataform reading mechanism reads a dataform through a different portion of the exit window, wherein in a first position of the plurality of support positions a dataform is read through a first portion of the exit window and in a second position of the plurality of support positions a dataform is read through a second portion of the exit window that is spaced apart from the first portion of the exit window.

18. The hand held dataform reader of claim 17 wherein the axis of rotation is substantially parallel to a longitudinal axis of the body portion.

19. The hand held dataform reader of claim 18 wherein the exit window is substantially perpendicular to the axis of rotation.

20. The hand held dataform reader of claim 17 wherein the exit window is substantially annular in shape and the plurality of support positions encompasses an angle of substantially 360°.

* * * * *